United States Patent [19]

Thomas et al.

[11] 4,364,446

[45] Dec. 21, 1982

[54] GENERATING PULSES

[75] Inventors: David L. Thomas, Columbus; William S. Pope, Reynoldsburg, both of Ohio; William B. Huckabay, Dallas, Tex.

[73] Assignee: Battelle Memorial Institute, Columbus, Ohio

[21] Appl. No.: 152,859

[22] Filed: May 23, 1980

[51] Int. Cl.³ .................... G01V 1/137; G01V 1/38
[52] U.S. Cl. .................... 181/120; 181/113; 367/144
[58] Field of Search ........... 181/110, 113, 116, 118, 181/119, 120; 367/144; 60/542; 175/297

[56] References Cited

U.S. PATENT DOCUMENTS

| | | | |
|---|---|---|---|
| 3,276,534 | 10/1966 | Ewing et al. | 181/113 |
| 3,379,272 | 4/1968 | Brooks | 181/113 |
| 3,379,273 | 4/1968 | Chelminski | 181/120 |
| 3,397,755 | 8/1968 | Loper | 181/118 |
| 3,434,562 | 3/1969 | Johnson | 60/542 |
| 3,506,085 | 4/1970 | Loper | 181/119 |
| 3,638,752 | 2/1972 | Wakefield | 181/113 |
| 3,653,460 | 4/1972 | Chelminski | 181/119 |
| 3,750,097 | 7/1973 | Havlik et al. | 367/144 |
| 3,779,335 | 12/1973 | Chelminski | 181/120 |
| 3,997,021 | 12/1976 | Chelminski | 181/120 |
| 4,034,827 | 7/1977 | Leerskov et al. | 367/144 |
| 4,047,591 | 9/1977 | Ward et al. | 181/119 |
| 4,049,078 | 9/1977 | Paitson et al. | 60/542 |
| 4,051,918 | 10/1977 | Rogers | 181/119 |
| 4,098,369 | 7/1978 | Altschuler et al. | 181/120 |
| 4,114,723 | 9/1978 | Paitsen et al. | 181/120 |
| 4,180,139 | 12/1979 | Walker | 181/115 |
| 4,230,201 | 10/1980 | Bogs | 367/144 |

OTHER PUBLICATIONS

Explorations Equipment Research, Inc., Galveston, Texas, Ad. "EERI Model 3 Air Gun".

Primary Examiner—Nelson Moskowitz
Attorney, Agent, or Firm—Kenneth R. Warburton; C. Henry Peterson

[57] ABSTRACT

Methods and devices are disclosed for generating acoustic pulses in a water or land medium, e.g., for use in seismic investigations. The pulse amplitudes, waveshapes, and frequencies can be controlled by signals that may originate at a remote location. Compressed gas is confined at high pressure in a valve chamber (12, 194). An initiating signal causes the opening of a passage (54, 56, 192) from the chamber into the medium to initiate the rise of a pressure pulse therein. A second signal causes the closing of the passage in a manner such that the initial rise of the pressure pulse is limited by the closure of the passage. In one device, the passage is opened by one sleeve valve member (60) and closed by another sleeve valve member (58). In another device the passage is opened by a sleeve valve member (196) whose motion to open the passage is arrested substantially instantaneously by transferring its momentum to a momentum exchange sleeve (246) that is then gradually decelerated. The passage may be closed by the same sleeve valve member (196) whose motion to close the passage is arrested substantially instantaneously by transferring its momentum to a second momentum exchange sleeve (220) that is then gradually decelerated.

12 Claims, 9 Drawing Figures

GENERATING PULSES

The Government has rights in this invention pursuant to Contract Number N00014-78-C-0154 awarded by the Department of the Navy.

TECHNICAL FIELD

This invention relates to compressed gas discharge methods and devices for generating acoustic pulses in a water or land medium. Such devices are sometimes referred to as seismic air guns. The present invention relates more particularly to improved methods and devices whereby the amplitude and waveshape of the pulses can be controlled in response to signals such as pneumatic, hydraulic or electrical signals that may originate at a remote location.

BACKGROUND ART

Compressed gas methods and devices for generating acoustic pulses in a medium such as earth formations, soil, marsh land or swamps are described in U.S. Pat. Nos. 4,051,918 Rogers and 3,997,021 and 3,779,335 Chelminiski. Similar methods and devices are used for generating pulses in a water medium, as described in U.S. Pat. Nos. 4,049,078 Paitson, 4,047,591 Ward, 4,034,827 Leerskov, 3,750,097 Havlik, 3,653,460 Chelminski, 3,506,085 Loper, 3,434,562 Johnson, 3,397,755 Loper, and 3,379,273 Chelminski.

A typical gun comprises a valve chamber adapted to confine a charge of compressed gas (ordinarily air) at a high pressure. There is at least one passage for the compressed gas from the valve chamber into the surrounding medium (e.g., water). This passage is closed while the pressure (as from a compressor on a surface vessel) is built up in the chamber. The passage is opened when the gun is "fired", allowing the compressed gas to expand out of the chamber and into the surrounding medium.

Since the discharge of a seismic air gun occurs with the release of substantial explosive force, and since the gun is usually adapted for use under water, down a borehole or the like, the firing is ordinarily effected in response to a pneumatic or electrical signal originating at a remote location. After the gun is fired, the passage from the valve chamber into the medium must be closed and the chamber must be recharged to the high pressure before the gun can be fired again. In some cases, the individual steps in the sequence of charging the chamber, opening the passage to discharge the gun, and reclosing the passage to allow recharging, have been effected or initiated in response to separate remotely-originating signals, as disclosed in U.S. Pat. Nos. 3,506,085 and 3,397,755 Loper and 3,379,273 Chelminski. In most cases, however, the design of the gun is such that the sequence is semi-automatic, with the gun being discharged in response to a discrete firing signal or in response to a drop in the pressure of the air line to the compressor.

To open and close the passage between the valve chamber and the surrounding medium, many seismic air guns utilize a shuttle member having an actuating piston or the like on one end, and a valve portion on the other end for opening and closing one or more port apertures. Guns using the shuttle arrangement are disclosed in U.S. Pat. Nos. 4,047,591; 4,034,827; 3,997,021 and 3,653,460 supra; 3,638,752 Wakefield; 3,506,085; 3,434,562; 3,397,755 and 3,379,273 supra; 3,379,272 Brooks and 3,276,534 Ewing. U.S. Pat. No. 3,750,097 supra discloses a somewhat different, floating-piston valve arrangement.

Other seismic air guns utilize axially-movable sleeve valves that surround a portion of the valve chamber, as disclosed in U.S. Pat. Nos. 4,051,918; 4,049,078 and 3,638,752 supra. U.S. Pat. No. 4,049,078 discloses a motor and cam arrangement for actuating the sleeve valve. The other two patents disclose sleeve valves activated by the pressure of the compressed gas on axial thrust-producing areas of the sleeve valve members. A typical embodiment of the present invention utilizes a sleeve valve arrangement that is generally of the latter type.

The operators of the prior art seismic air guns have been able to exercise some measure of control over the amplitude and waveshape of the generated pulses insofar as they could select the pressure within the valve chamber and the depth (in water) at which the gun was fired. Some guns have also been designed with interchangeable parts, whereby a selection of a parameter such as the effective volume of the air-confining chamber could be made (with some inconvenience) as a means of influencing the characteristics of the generated acoustic pulses. Otherwise the pulse characteristics were effectively predetermined by the design of the gun.

DISCLOSURE OF INVENTION

In accordance with this invention, we provide a method of generating an acoustic pulse in a water or land medium, comprising the steps of confining compressed gas at high pressure in a valve chamber within the medium, generating an initiating signal, responding to the signal by opening a passage for the compressed gas from the chamber into the medium so as to initiate the rise of a pressure pulse therein, generating a second signal during the initial rise of the pressure pulse, and responding to the second signal by closing the passage in a manner such that the initial rise of the pressure pulse is limited by the closure of the passage.

The method may be performed utilizing first and second sleeve valve members, confining the gas in the valve chamber by holding the first sleeve valve member in a respective base position closing the passage, the second sleeve valve member being held in a respective base position clearing the passage, responding to the initiating signal by moving the first sleeve valve member toward a respective displaced position wherein it clears the passage, and responding to the second signal by moving the second sleeve valve member from its respective base position toward a respective displaced position wherein the passage is closed.

The first sleeve valve member may be allowed to reach its respective displaced position before the second sleeve valve member is moved from its respective base position, so that the passage is substantially fully open for a period of time determined by the length of the time interval between the initiating signal and the second signal. Alternatively the second sleeve valve member may be moved from its respective base position before the first sleeve valve member reaches its displaced position, so that the passage is only partially open an amount determined by the length of the time interval between the initiating signal and the second signal.

The method may be performed alternatively utilizing a sleeve valve member that is axially movable between a base position closing the passage and a displaced position clearing the passage, responding to the initiating signal by driving the sleeve valve member toward the displaced position, arresting the motion of the sleeve valve member at the displaced position by substantially instantaneously transferring most of its momentum to a momentum exchange sleeve, and gradually decelerating the momentum exchange sleeve.

The method may include responding to the second signal by driving the sleeve valve member toward the base position, arresting the motion of the sleeve valve member at the base position by substantially instantaneously transferring most of its momentum to a second momentum exchange sleeve, and gradually decelerating the second momentum exchange sleeve.

In order to effectively carry out the foregoing methods, the present invention further provides a compressed as discharge device adapted for generating acoustic pulses, comprising a valve body encompassing a generally cylindrical valve chamber for containing compressed gas and having port means adapted to provide a passage from the valve chamber into a region surrounding the valve body, a first and a second sleeve valve member each enclosing a portion of the valve chamber and each being axially movable between a respective base position and a respective displaced position, the valve members being adapted to clear the passage when one member is in its base position and the other is in its displaced position, the valve members also being adapted to close and seal the passage when both members occupy their displaced positions or when both members are in transit from their displaced positions to their base positions, and signal responsive means for initiating movement of each sleeve valve member individually from its respective base position to its respective displaced position, thereby to control both the commencement and the time duration of a flow of gas from the valve chamber through the passage.

Typically each of the valve members has axial thrust producing areas adapted to receive pressure from the compressed gas contained in the valve chamber, each of the valve members also having a differential axial thrust producing area, the device having means for individually sealing off the differential areas from the pressure of the gas contained in the valve chamber when the respective valve member is in its base position, the thrust producing areas being sized so that when the pressure in the valve chamber acts on the differential area of a respective valve member it receives a net axial force for driving it toward the displaced position, the signal responsive means selecting the pressure acting on the differential areas at least while a respective valve is in its base position.

The sealing off means may be effective on arrival of the one member at its displaced position to seal off the differential area of the other member from the pressure of the gas contained in the chamber, and the axial thrust producing areas of the one sleeve valve member may be smaller than those of the other sleeve valve member, whereby a net axial force produces retraction of both sleeve valve members together from their displaced position to their base position.

An annular dashpot means may at least partially encircle a portion of the valve chamber, the dashpot means being effective when a sleeve valve member approaches one of its base and displaced positions to decelerate the motion of the member. Where the device is adapted for operation under water, the dashpot means may be in fluid-transfer communication with the underwater region surrounding the valve body when the device is in use.

In another embodiment of the invention, the compressed gas discharge device comprises a valve body defining a generally cylindrical valve chamber for containing compressed gas and having port means adapted to provide a passage from the valve chamber into a region surrounding the valve body, gas pressure source means, a sleeve valve member enclosing a portion of the valve chamber and being axially movable between a base position closing the passage and a displaced position clearing the passage, the sleeve valve member having respective first and second axial thrust producing areas adapted to receive pressure from the gas pressure source means and to produce respective axial forces urging the valve member toward the respective base and displaced positions, signal responsive means for applying pressure from the gas pressure source means individually to the first and second axial thrust producing areas so as to selectively drive the sleeve valve member toward either its base or its displaced position, thereby to control the timing of both the commencement and the termination of a flow of gas from the valve chamber through the passage, momentum exchange sleeve means adapted for dynamic interaction with the sleeve valve member when it approaches one of its base and displaced positions so as to substantially acquire the momentum of the sleeve valve member and thereby arrest its motion at the one position, and annular dashpot means for decelerating the motion of the momentum exchange sleeve.

BEST MODES FOR CARRYING OUT THE INVENTION

Figure 1:
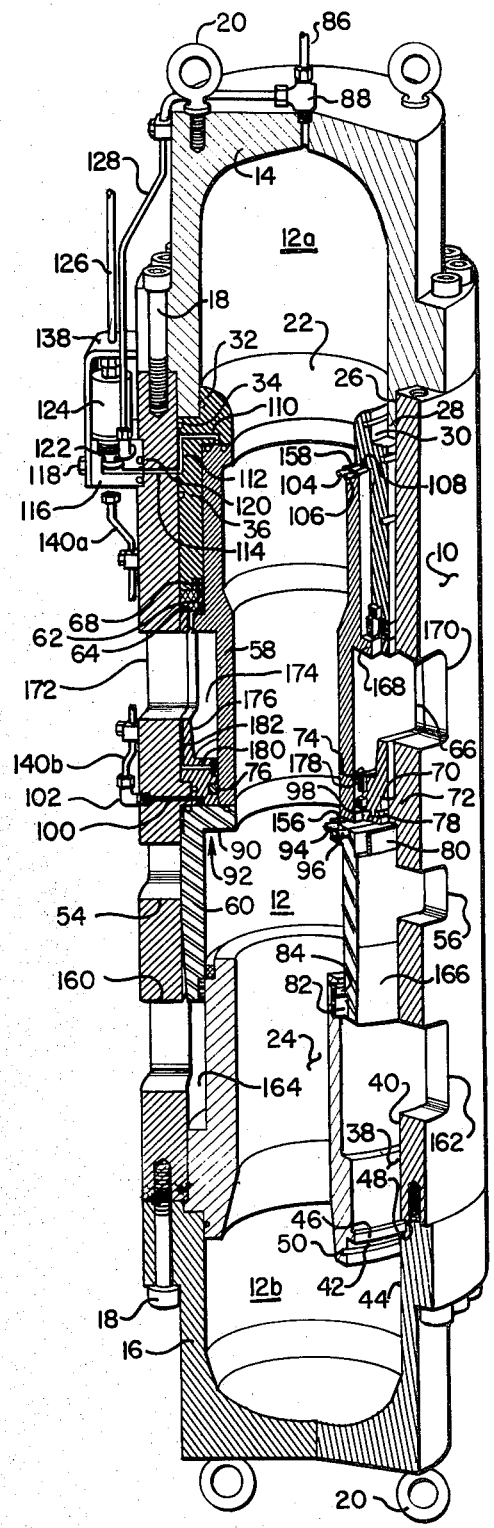
FIG. 1 is a cutaway view in perspective, showing a device for generating acoustic pulses according to the invention.

Referring to FIG. 1, there is shown a compressed gas discharge device for generating acoustic pulses. The device comprises a valve body 10 that defines a generally cylindrical valve chamber 12. The valve chamber extends centrally and axially of the valve body 10, terminating in a domed upper end 12a and an inverted domed lower end 12b. The upper and lower valve chamber ends 12a and 12b are defined by end cap closure members 14 and 16 respectively. Each end cap is secured to the valve body 10 by a multiplicity of high strength tension bolts as at 18. A pair of heavy forged eye bolts as at 20 are screwed into each end cap 14 or 16. The eye bolts 20 are used for attachment of the gas discharge device to tow lines or suspension cables for supporting and/or guiding the device in or through a body of water, an earth borehole, or the like. Typically the device is towed behind a seagoing ship or other vessel.

The upper and lower end caps 14 and 16 are adapted to retain respective end pieces 22 and 24. The end pieces are aerodynamically shaped to facilitate rapid flow of compressed gas from the valve chamber ends 12a and 12b to the central portion of the valve chamber indicated at 12. The upper end piece is held down in the inner bore 26 of the valve body 10 by a turned projection 28 on the upper end cap 14. The projection 28 fits in between the bore 26 and an accommodating turned projection 30 on the end piece 22. The end piece 22 has three circumferential grooves containing O-rings 32, 34 and 36 to form gas seals between the end piece 22 and the end cap 14 and between the end piece 22 and the valve body 10.

The lower end piece 24 has a portion 38 that fits into the lower bore 40 of the valve body 10. The end piece 24 has another portion 42 that fits into an accommodating bore 44 in the lower end cap 16. End cap 16 is counterbored at the top to receive a circumferential land 46 that is an integral part of the lower end piece 24 between portions 38 and 42. The top surface of the land 46 abuts the bottom end of the valve body 10 as shown at 48. Thus the lower end piece 24 is secured against axial movement relative to the valve body 24 and the lower end cap 16. The downwardly projecting portion 42 of end piece 24 has a circumferential groove containing an O-ring 50.

The device of FIG. 1 has port means adapted to provide a passage for the compressed gas from the valve chamber 12 into a region (typically an underwater region) surrounding the valve body 10. As shown, the port means comprises a plurality of generally rectangular port openings as at 54 and 56 in the valve body 10.

The passage, as through port openings 54 and 56, can be selectively opened and closed by first and second sleeve valve members 58 and 60. Each of the sleeve valve members 58 and 60 encloses a portion of the valve chamber 12 and each is axially movable between a base position as shown and a respective displaced position to be described.

The one sleeve valve member 58 is slidably mounted in annular bearings. Its upper bearing comprises a bushing 62 within a bearing ring 64. The bearing ring 64 is secured between the upper end piece 22 and a snubbing ring 66 to be further described. The end piece 22 is counterbored to receive a dynamic seal 68 that is secured between the bearing ring 64 and the end piece. The snubbing ring 66 has a free fit in the upper bore 26 of the valve body 10. The bottom end of the snubbing ring 66 has a stepped portion 70 that sits on a land 72. Land 72 is an integral, reduced diameter portion of the valve body 10, between the upper bore 26 and the lower bore 40.

The lower bearing for the one sleeve valve member 58 comprises a bushing 74 in the snubbing ring 66. The snubbing ring 66 has an inner circumferential groove containing a dynamic seal 76. The snubbing ring 66 also has an outer circumferential groove containing an O-ring 78 to form a seal between the snubbing ring and the land 72.

The other sleeve valve member 60 has an upper bearing comprising a collar 80 of bearing metal that is shrunk over a turned, reduced-diameter portion at the top periphery of the sleeve valve member 60. The lower bearing comprises a bushing 82 within the counterbored lower end of the sleeve valve member 60, whereby the lower end of member 60 is mounted for sliding movement along the upstanding guide portion of the lower end piece 24. A dynamic seal 84 is mounted over a turned projection at the top of the lower end piece 24.

When the sleeve valve members 58 and 60 are in their base positions, as shown, the valve chamber 12 can be pressurized with a compressed gas (typically air) at a typical pressure of up to around four hundred kilograms per square centimeter (six thousand pounds per square inch). Typically compressed air is piped in, through an air line 86 and T-fitting 88, from an air compressor unit on a surface vessel. At this time the dynamic seal 84 is active to prevent leakage of gas between the sleeve valve number 60 and the lower end piece 24.

The top of the sleeve valve member 60 has an inwardly directed flange 90 forming a reduced-diameter portion that abuts the lower end of the upper sleeve valve member 58. The underside 92 of the flange 90 provides an axial thrust-producing area adapted to receive pressure from the compressed gas contained in the valve chamber 12. This pressure generates a thrust urging the sleeve valve member 60 upwardly into engagement with the upper sleeve valve member 58 and the land 72 simultaneously. The top face of the sleeve valve member 60 is grooved to retain two O-rings 94 and 96 adapted to form seals between the lower sleeve valve member 60 and the upper sleeve valve member 58 and the land 72 respectively. Under static conditions with the parts in the position shown, the O-ring 94 is active as a seal for retaining the compressed gas in the chamber 12. At this time the space between the O-rings 94 and 96 is vented, by means to be further described, to ambient (e.g., underwater) pressure. The vent passage extends through a face groove 98 in the end of the snubbing ring 66, and drilled passages as at 100, in the valve body 10 and the snubbing ring 66, communicating with a gas pressure line fitting 102 that is screwed into the valve body 10.

In a similar manner, the top face of the upper sleeve valve member 58 is grooved to retain two O-rings 104 and 106 adapted to form two seals between the upper sleeve valve member 58 and the upper end piece 22. Under static conditions with the parts in the position shown, the O-ring 104 is active as a seal for retaining gas in the chamber 12. At this time the space between the O-rings 104 and 106 is vented to ambient pressure. The vent passage extends through a face groove 108, drilled passages as at 110 in upper end piece 22, axially-extending grooves as at 112 in the end piece 22, and drilled passages as at 114 in valve body 10 and a valve mounting block 116.

The valve mounting block 116 is secured to the valve body 10 with bolts as at 118. The juncture of the passage 114 with the corresponding passage in the block 116 is sealed by an O-ring 120. A valve 122 is screwed into block 116, and the valve 122 is operated by a solenoid 124 adapted to be electrically energized via conductors in a connecting lead 126. The valve 122 is supplied with high-pressure compressed gas via a pressure line 128 and the T-connection 88 that communicates with the upper end 12a of the valve chamber 12.

Figure 2:
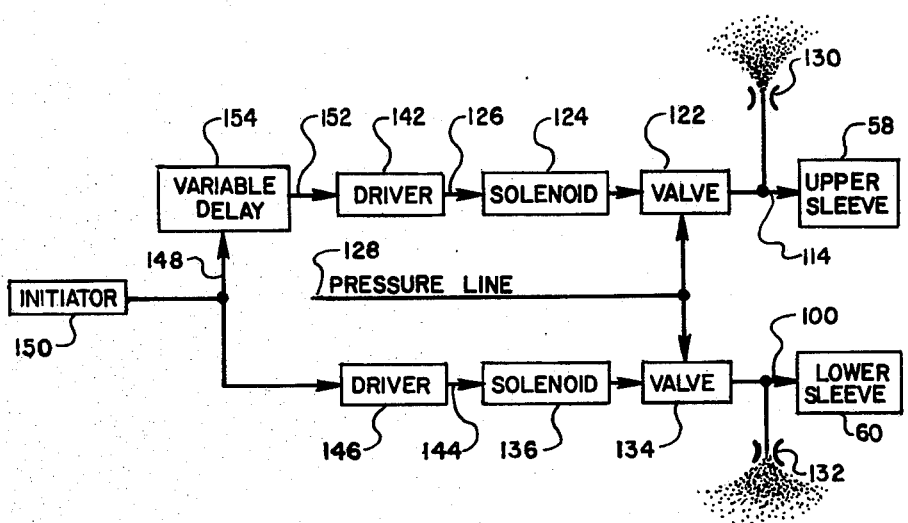
FIG. 2 is a schematic diagram of a control system for the device of FIG. 1.

Typical controls for the compressed gas discharge device of FIG. 1, including the valve and solenoid arrangement just described, are shown schematically in FIG. 2. Here it is indicated that the upper sleeve valve 58 is controlled by the gas pressure in passage 114.

When valve 122 is closed, the pressure in passage 114 can equalize with ambient pressure through an orifice 130 (not shown in FIG. 1) that connects the passage 114 with the surrounding (e.g., underwater) medium. When the valve 122 is open, the pressure from pressure line 128 may act on upper sleeve 58 via passage 114. While some gas escapes through the orifice 130 at this time, the gas loss is insignificant due to the orifice restriction.

In a similar manner, FIG. 2 indicates that the lower sleeve valve 60 is controlled by the gas pressure in passage 100, connected to an orifice 132 and valve 134 that is in turn controlled by a solenoid 136. In the typical embodiment shown in FIG. 1, the valve 134 and solenoid 136 are located alongside of valve 122 and solenoid 124, but do not appear in the cutaway view. The valves 122 and 134 share the mounting block 116, and the solenoids 124 and 136 are protected by a common cover 138 that is held in place by the bolts as at 118. The valve 134 connects to passage 100 via an externally mounted high pressure line 140 shown in FIG. 1 in two pieces 140a and 140b since the line 140 does not pass directly in front of a port 172 to be later described. The orifices 130 and 132 (not shown in FIG. 1) may conveniently comprise restrictors screwed into mounting block 116.

Line 126 connects solenoid 124 to a first driver 142, and similarly a line 144 connects solenoid 136 to a second driver 146. Each of the drivers 142 and 146 typically comprises a conventional solid-state switching device adapted to control the application of electrical power from a power source (not shown) to a respective solenoid. Driver 146 is connected via a line 148 to an initiator 150. The other driver 142 is connected to line 148 and initiator 150 through a line 152 and a variable delay device 154.

Initiator 150 in its simplest form comprises an electrical pushbutton, although it can be part of a programmed device, a radio link, or other instrument for determining when an acoustic pulse is to be generated by the device of FIG. 1. Activation of the initiator 150 produces instantaneously an electrical signal on line 148 that triggers the driver 146. The signal on line 148 also triggers the variable delay device 154.

Typically the delay device 154 comprises a conventional solid state module including an electronic counter adapted to count electrical pulses derived from a clock oscillator having a typical pulse frequency on the order of five hundred kilohertz. The delay module also includes means for setting a predetermined count and means including a comparator for generating a second signal on line 152 when the actual pulse count reaches the predetermined count. The signal on line 152 triggers the driver 142.

The operation of the system of FIGS. 1 and 2 can now be described. With the parts in the position shown, gas at high pressure is confined in valve chamber 12. Typically the valve chamber, surrounded by valve body 10, is submerged within a seawater medium. The sleeve valve members 58 and 60 are maintained in the position shown principally by the gas pressure acting on the axial thrust producing area 92 of sleeve valve member 60. Dynamic seal 84, O-ring 94 and O-ring 104 are active to prevent substantial leakage of gas from the valve chamber 12.

Drilled passages 100 and 114, and in turn the facial areas of the sleeve valve members 58 and 60 between O-rings 94 and 96 and between O-rings 104 and 106 are exposed substantially to ambient seawater pressure by virtue of orifices 130 and 132. Hence the gas pressure on area 92 remains effective to generate a net upward axial thrust on the sleeve valve members 58 and 60 despite the possibility of a small amount of gas leakage past O-rings 94 and 104.

The areas as at 156 and 158 between O-rings 94 and 96 and between O-rings 104 and 106 are differential axial thrust producing areas. In essence, the function of the control system of FIG. 2 is to determine whether these differential areas are acted on by ambient seawater pressure or by the high pressure of the gas (compressed air) in the valve chamber 12.

When it is desired to generate an acoustic pulse in the medium (seawater) surrounding the valve chamber 12, the initiator 150 produces an electrical initiating signal on line 148, causing driver 146 to energize solenoid 136 and starting the pulse count in variable delay unit 154. Solenoid 136 immediately operates valve 134, applying the high gas pressure in chamber 12 as a pneumatic initiating signal to passage 100 and thence to the differential axial thrust producing area 156 between O-rings 94 and 96. This tends to equalize the pressure on areas 92 and 156. However, the areas inside the O-ring 96 is greater than area 92 because the O-ring 96 has a greater diameter than the inside of the sleeve valve member 60. Hence a net downward axial thrust develops on the sleeve valve member 60, causing it to move from its base position.

As soon as O-rings 94 and 96 have separated from the bottom faces of sleeve valve member 58 and land 72, the high pressure of the compressed gas in valve chamber 12 acts on the full area of the upper face of the sleeve valve member 60, causing the member 60 to accelerate very rapidly downward. The other sleeve valve member 58 remains in place in its base position shown, since the pressure in valve chamber 12 now acts on the full area of the lower face of member 58. This area is bounded at a greater diameter than the diameter of O-ring 104, and hence the net axial thrust on the sleeve valve member 58 is upward.

Once the O-ring 94 has separated from the bottom face of sleeve valve member 58, the pneumatic initiating signal, that was initially applied to passage 100 by valve 134, has done its work. Valve 134, which no longer has any control, should now be reset to its closed position. This is effected by a timing device, typically a monostable (one-shot) multivibrator (not shown) incorporated in the driver 146. This timing device controls the switching action of driver 146 so that electrical power is applied to solenoid 136, and valve 134 remains open, only for periods of time sufficient to ensure that the lower sleeve valve member 60 is initially moved far enough downwardly to allow the O-ring 94 to clear the bottom face of the upper sleeve valve member 58.

The sleeve valve member 60 moves downward very rapidly until it clears the ports as at 54 and 56, thus opening a passage through the ports for the compressed gas from the chamber 12 into the medium (seawater) so as to initiate the rise of a pressure pulse therein.

Because of the high velocity attained by the sleeve valve member 60 during its downward acceleration, it is decelerated before reaching the lower limit of its travel to prevent damage to the parts that would otherwise occur as the result of a high-speed impact. In the embodiment shown in FIG. 1, ports as at 160 and 162 are provided in the valve body member 10 to allow seawater to flood the space between the lower bore 40 and the endpiece 24. The seawater fills an annular snubbing chamber 164 that is formed by the portion of this space below the ports 164 and 162. In its initial downward movement, the sleeve valve member 60 freely displaces the seawater through the ports 160 and 162. However, an instant before the member 60 reaches a displaced position where its top face fully clears the gas ports 54 and 56, its bottom end starts to enter the snubbing chamber 164. The water-filled snubbing chamber and the end of the sleeve valve member 60 now form an annular dashpot for decelerating the motion of member 60.

The bottom end of sleeve valve member 60 has a tapered portion 166 that provides a relatively wide clearance for the escape of the seawater when the member 60 first enters the snubbing chamber 164 at high velocity. The tapered portion 166 provides a smaller and smaller clearance as the member 60 penetrates farther into the snubbing chamber and its rate of movement becomes less and less rapid. This produces a pressure in the snubbing chamber, and an upwardly-directed decelerating thrust against sleeve valve member 60, that remains relatively constant without becoming excessive at any time while the member 60 is being decelerated. The sleeve valve member 60 eventually impacts and comes to rest on the end piece 24, both at the lower end of member 60 that strikes the bottom of the snubbing chamber 164 and at the underside of the flange 90 substantially simultaneously.

The lower sleeve valve member 60 remains at rest there in its maximum displaced position, while compressed gas from the valve chamber 12 escapes from the ports as at 54 and 56, until after the electrical pulse count registered by the pulse counter (not shown) in the variable delay device 154 (FIG. 2) attains the set value of the predetermined count. At this time the delay device 154 generates a second electrical signal that is fed over line 152 to driver 142. The driver then activates the solenoid 124 and the valve 122 in the manner previously described for driver 146, solenoid 136 and valve 134.

In this case the operation of the valve 122 generates a second pneumatic signal by applying the pressure within the chamber 12 to the drilled passage 114. This tends to equalize the pressure on the differential thrust producing area 158 between O-rings 104 and 106 with the chamber 12 pressure acting upwardly on the bottom face of the sleeve valve member 58. However, the area on the top face of member 58 within the O-ring 106 is greater than the area of the bottom face of member 58, resulting in an unbalanced force that causes the sleeve valve member 58 to move downwardly from its base position as shown.

Once the O-ring 106 has separated from the end piece 22, the pressure of the compressed gas in chamber 12 acts on the full area of the top face of sleeve valve member 58, accelerating it downwardly. The second pneumatic signal that was initially applied to drilled passage 114 by valve 122 has done its work, and valve 122 is reset in due time to its closed position in the same manner as described hereinabove in the discussion of the operation of valve 134.

The outside of the sleeve valve member 58 carries an integral shoulder portion 168 that traverses a space flooded with seawater through a set of ports as at 170 and 172. The sleeve valve member 58 initially moves downward freely, displacing seawater both through the ports as at 170 and into the space previously swept by the shoulder 168. However, as soon as the shoulder 168 reaches the bottom edge of the seawater ports, it enters a snubbing chamber 174 formed between the outer wall of the sleeve valve member 58 and the snubbing ring 66. The shoulder 168 and the snubbing chamber 174 form an annular dashpot for decelerating the motion of the sleeve valve member 58. The snubbing chamber wall 176 formed by the snubbing ring 66 is slanted to flare outwardly at the top to provide a gradually decreasing clearance for the escape of seawater as the sleeve valve member 58 penetrates farther into the snubbing chamber and has its velocity decreased. This tends to result in a relatively constant, high but not excessive pressure in the snubbing chamber 174 while the sleeve valve member 58 is being decelerated.

The pressure in the snubbing chamber, combined with the movement of the sleeve valve member 58, may cause some seawater to escape past the top of the bushing 74 and the wall of member 58. This seawater is collected by an inner peripheral groove 178, in the bushing 74, that is vented to the region of the seawater ports as at 170 and 172 through a series of drilled radial passages as at 180 and axially-extending milled grooves as at 182 in the outside of the snubbing ring 66. The vent system is designed to prevent the build up of pressure in the area that might force fluid the wrong way past the dynamic seal 76. This seal, like the other dynamic seals 68 and 84, is an O-ring-loaded lip type of seal. The seal 76 prevents the high pressure gas from blowing the seawater out of the snubbing chamber 174 and thus defeating its purpose in preventing sleeve valve impact damage. Seal 76 also prevents loss of pressure when the pneumatic initiating signal for actuating the lower sleeve valve member 60 is applied via passage 100. It is thus quite important to maintain the effectiveness of this seal.

As the sleeve valve member 58 moves downwardly to its displaced position, the passage for compressed gas from the valve chamber 12 through the ports as at 54 and 56 becomes limited by the decreasing clearance between the top of the sleeve valve member 60 and the bottom of the sleeve valve member 58. At the limit of travel for member 58, it engages on the O-ring 94, and the passage for the compressed gas is thereby closed. The compressed gas remaining in the valve chamber 12 is confined therein without leakage due to the action of dynamic seals 68 and 84 together with O-ring 94.

The closure of the compressed gas passage through the ports as at 54 and 56 causes the pressure on the top face of the sleeve valve member 60 outside of O-ring 94 to return to ambient pressure. The upward axial thrust on the area 92 is now sufficient to cause both sleeve valve members 58 and 60 to move upwardly. The downward thrust due to the action of the chamber 12 pressure on the top face of member 58, however, maintains the pressure seal at O-ring 94 and causes the two sleeve valve members 58 and 60 to move as a single unit. The net upward thrust on the members results from the fact that the axial thrust producing area 92 is greater, because of its greater diameter, than the area on the top face of member 58. As soon as the sleeve valve members 58 and 60 arrive at their base positions as shown, with O-ring 96 in contact with the land 72 and O-rings 104 and 106 in contact with the upper end piece 22, the initial conditions have been restored, and the device is ready to generate another pulse, at least as soon as sufficient gas pressure has been restored in chamber 12.

Figure 3:
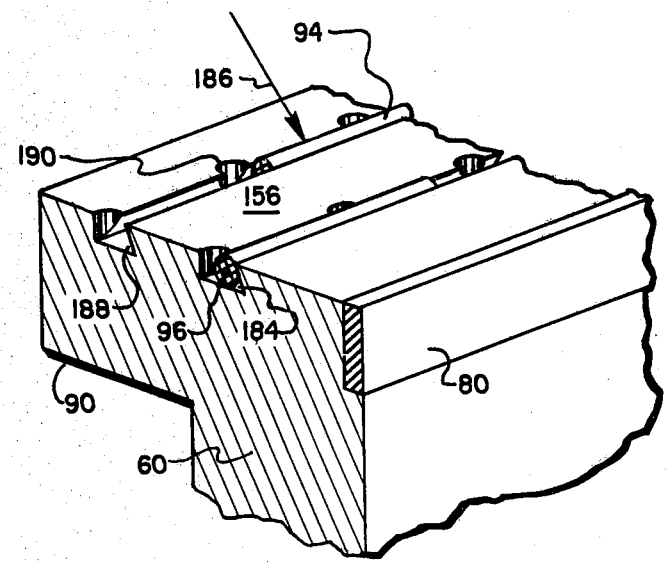
FIG. 3 is an enlarged view of a portion of FIG. 1.

As shown in FIG. 3, the O-rings 94 and 96 are installed in dovetail grooves as at 184 in the end face of sleeve valve member 60. A similar arrangement (not shown) is used for the O-rings 104 and 106 installed in sleeve valve member 58. When the O-ring 94, for example, is active as a seal to retain the high pressure gas in the chamber 12, the gas pressure is exerted downwardly and radially on the O-ring as shown by the arrow 186. This pressure tends to deform the O-ring and crowd it into the corner 188 while the gas pressure builds up in the opposite corner behind the O-ring. When the O-ring moves away from its seat against the face of upper sleeve valve member 58 (FIG. 1) the external gas pressure on the O-ring drops sharply and substantially due to the Bernoulli effect of the gas stream rushing past the O-ring and the establishment of communication with an ambient pressure region.

To forestall the possibility that high pressure gas trapped under the O-ring may blow the O-ring out of its retaining groove, a series of vent openings as at 190 are provided. These vent openings may be formed by using an end mill to cut away the overhanging portion of the dovetail groove on the high pressure side of the O-ring. The vent openings 190 allow the pressure to be equalized quickly on both sides of the O-ring, thus reducing the possibility of a blowout.

Figure 4:
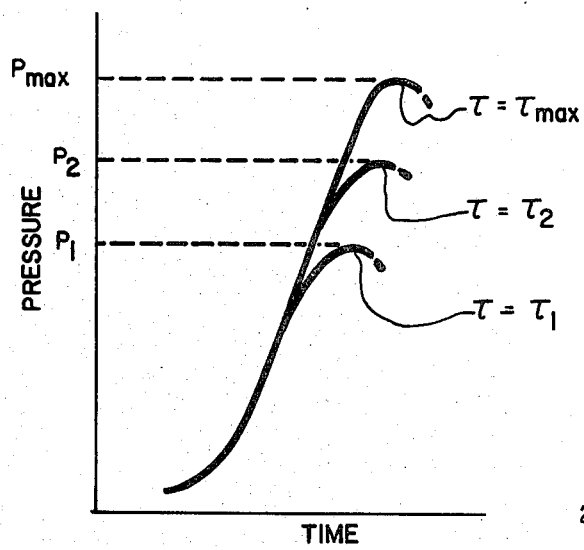
FIG. 4 is a conceptual graph of pressure as a function of time, showing the initial portions of typical acoustic pulses generated in accordance with the invention.

The generation of an acoustic pulse in a water medium, for example, can be summarized with reference also to FIG. 4. The graphs show conceptually the pressure (above ambient) in the surrounding medium near the device of FIG. 1 as a function of time over a span of a few milliseconds.

When downward motion of the lower sleeve valve member 60 is initially triggered to open the passage for compressed gas through the ports as at 54 and 56 into the medium (e.g., water), a growing gas bubble forms in the water in the area of each of the ports and may grow until the plurality of growing bubbles has coalesced into one substantially toroidal bubble surrounding the device. The formation of the bubbles rapidly displaces a volume of water in the close vicinity of the device. This displacement is accompanied by the compression of a somewhat greater volume of water including that displaced by the bubbles.

The compression of the water volume in the region of the FIG. 1 device should be effected and maintained for a period of time sufficient to cause a pressure wave, containing a major portion of the energy released by the expansion of the compressed gas, to be propagated away from the device. However, if the expansion of the bubble(s) is not rapid enough, the energy released by the gas expansion may be largely dissipated by simply bodily displacing a large volume of water without achieving the desired amount of compression of the water. If the gas expansion cannot be sustained for a long enough period of time, the bubble may collapse and permit premature re-expansion of the compressed water near the device, or the device may even "swallow the bubble" through the open ports.

Hence for a given pressure of the initial compressed gas charge in the valve chamber 12 of the device of FIG. 1, there is a maximum pressure $P_{max}$ (FIG. 4) that can be produced by that device in the surrounding water at a given depth. The maximum pressure $P_{max}$ can be associated with a maximum useful value $\tau_{max}$ of the time delay $\tau$ that is set on the variable delay device 154 (FIG. 2). Delay $\tau_{max}$ in turn determines the maximum useful time between the opening of the gas passage through the ports as at 54 and 56 by the lower sleeve valve member 60 and the closing of the passage by the upper sleeve valve member 58. To set a much longer time delay, greater than $\tau_{max}$, causes reduction of amplitude of the pressure signal in the water because air in the bubble flows back into the ports.

Accordingly, in one mode of operation for the system of FIGS. 1 and 2, an initiating signal is generated by initiator 150 and solenoid valve 134. The device of FIG. 1 responds to the signal by opening the passage (through the ports as at 54 and 56) for the compressed gas from the chamber 12 into the medium (seawater) so as to initiate the rise of a pressure pulse therein. The pressure pulse is not ordinarily allowed to rise to the maximum attainable value $P_{max}$. Instead, the variable delay unit 154 and solenoid valve 122 generate a second signal during the initial rise of the pressure pulse. The FIG. 1 apparatus responds to the second signal by closing the passage through the ports in a manner such that the initial rise of the pressure pulse is limited by the closure of the passage.

For example, as illustrated in FIG. 4, if the variable delay unit is set to generate a second electrical signal after a delay time $\tau = \tau_1$, the initial rise of the pressure pulse is limited to the value $P_1$. If the set delay time is $\tau = \tau_2$, the initial rise of the pressure pulse is limited to $P_2$. In this way the amplitude (and corresponding frequency characteristics) of the generated acoustic pulses are fully controllable by a remotely located operator or programmed device. The full gamut of performance for the seismic gun can be exercised by varying the depth in water, the initial chamber 12 pressure and the time delay $\tau$, all while the device remains submerged.

It can be seen that the operation of the two sleeve valve members 58 and 60 is somewhat analogous to the operation of the focal plane shutters used in some cameras to effect and regulate the exposure of the film to light.

In the foregoing description the first sleeve valve member 60 is allowed to reach its respective displaced position before the second sleeve valve member 58 is moved from its respective base portion, so that the passage through the ports as at 54 and 56 is substantially fully open for a period of time determined by the length of the time interval $\tau$ between the initiating signal and the second signal.

Somewhat analogously also to the focal plane shutter, the methods and apparatus of the present invention provide another mode of operation wherein, by further shortening the time interval $\tau$ determined by the setting of the delay device 154, the second sleeve valve member 58 is moved from its respective base position before the first sleeve valve member 60 reaches its respective displaced position, so that the passage is only partially open an amount determined by the length of the time interval between the initiating signal and the second signal. The axial thrust producing area including area 156 on the top face of sleeve valve member 60 is different from the corresponding area including area 158 on the top face of sleeve valve member 58, and the Bernoulli pressure drop in the partially open passage between the valve members 58 and 60 must be considered during the design to achieve the desired action of the two valve members as they move across the region of the parts as at 54 and 56.

Figure 5A:
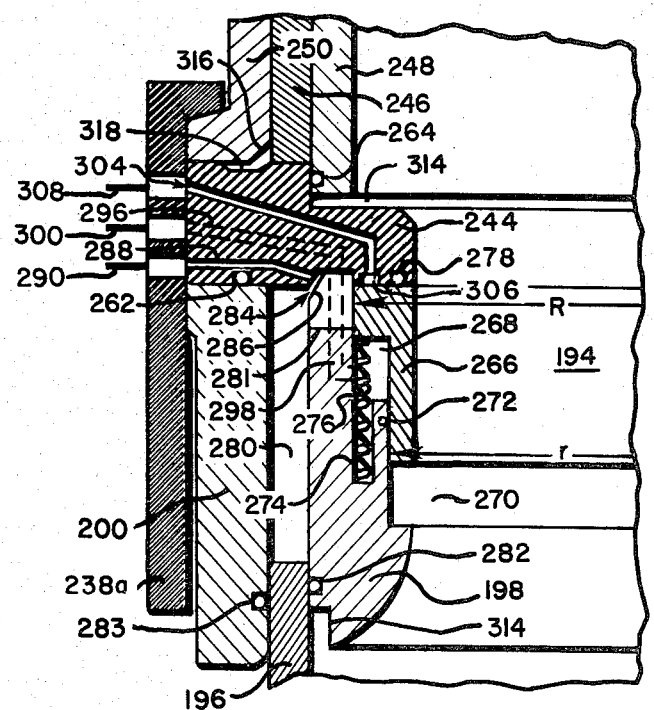
FIG. 5a is an enlarged view of a portion of FIG. 5.
Figure 5:
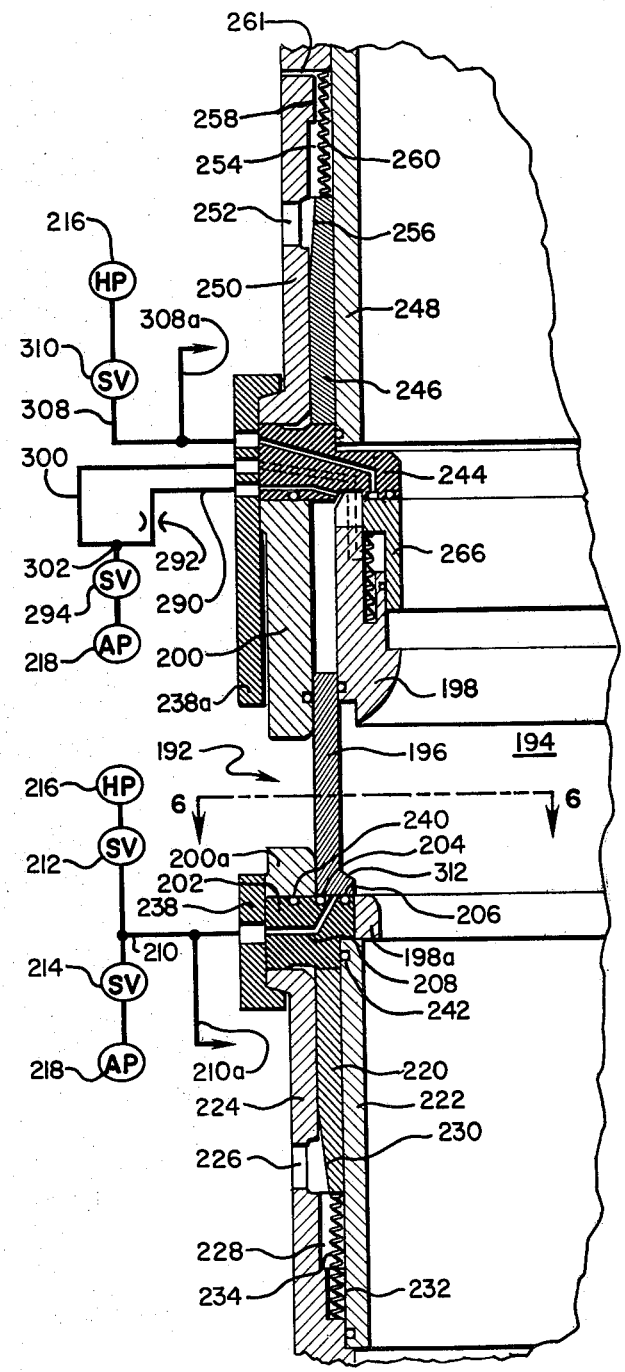
FIG. 5 is a schematic showing, partly in section, of another device for generating acoustic pulses according to the invention.

FIGS. 5 and 5a show schematically the main features of another embodiment of a compressed gas discharge device adapted to generate acoustic pulses in a water or land medium, typically seawater. These views show a partial radial section through the device in the region of one port 192 adapted to provide a passage from a valve chamber 194 into a region surrounding the device. A sleeve valve member 196 encloses a portion of the valve chamber 194 and is axially movable between a base position, as shown, closing the passage, and a displaced position, to be described, clearing the passage.

The sleeve valve member 196 is adapted to move axially between annular guides including an inner sleeve guide 198 and an outer sleeve guide 200. In its base position shown, the bottom face of the sleeve valve member 196 abuts a lower boundary member 202 that retains a pair of O-rings 204 and 206. The portion of the lower face of sleeve valve 196 between O-rings 204 and 206 is a differential thrust producing area that is subject to the pressure in a drilled passage 208. Passage 208 connects via a line 210 to a pair of solenoid valves (SV) at 212 and 214 that are respectively connected to a source 216 of high pressure (HP) compressed gas and to ambient pressure (AP) at 218.

The boundary member 202 abuts a momentum exchange sleeve 220 that is axially movable between a lower end piece 222 and a momentum exchange sleeve guide 224. Guide 224 contains seawater ports as at 226, and a snubbing chamber is formed at 228 between the guide 224 and the lower end piece 222. The momentum exchange sleeve 220 has a tapered portion 230 on its lower end that is adapted to form a relatively constant pressure annular dashpot in cooperation with the snubbing chamber 228. Guide 224 contains a plurality of spring wells as at 232 for retaining springs as at 234 for urging the momentum exchange sleeve 220 upwardly. The boundary member is adapted for limited deflection between a sleeve valve guide portion 200, end piece 222, exchange sleeve guide 224, and an inner sleeve guide portion 198*a*. The boundary member number 202 contains an O-ring seal 240 next to guide portion 200*a*, and the end piece 222 contains an O-ring seal 242 next to the boundary member.

In its fully displaced position, the sleeve valve member 196 abuts a second, upper boundary member 244. The boundary member 244 in turn abuts an upper momentum exchange sleeve 246. The momentum exchange sleeve 246 is axially movable between an upper end piece 248 and an upper momentum exchange sleeve guide 250. Guide 250 contains seawater ports as at 252, and a snubbing chamber is formed at 254 between the guide 250 and the upper end piece 248. The momentum exchange sleeve 246 has a tapered portion 256 on its upper end that is adapted to form a relatively constant pressure annular dashpot in cooperation with the snubbing chamber 254. Guide 250 contains a plurality of spring wells as at 258 to retain springs as at 260 for urging the momentum exchange sleeve 246 downwardly. The spring wells 258 are vented at the top through radially drilled passages as at 261 to avoid air traps that could prevent the snubbing chambers from being filled completely with seawater. The boundary member is adapted for very limited deflection between the sleeve valve guides 198 and 200, end piece 248, and momentum exchange sleeve guide 250. The boundary member 244 contains O-ring seals 262 and 264 next to sleeve valve guide 200 and upper end piece 248 respectively.

The sleeve valve guide member 198 is counterbored at the top in two steps so as to accommodate a pilot sleeve valve member 266 having a top portion of large radius R and a bottom portion of small radius r. The large radius portion is axially movable downward into a space 268, and the small radius portion them moves into a space 270. A dynamic seal 272 installed in guide member 198 next to the small radius portion of pilot sleeve valve member 266 isolates the space 268 under the large radius portion from the high pressure in the chamber 194. The guide member 198 contains a plurality of spring wells as at 274 for retaining springs as at 276 that urge the pilot sleeve valve member 266 upwardly into engagement with an O-ring 278 installed in the bottom face of the boundary member 244.

When the pilot sleeve valve member 266 moves away from O-ring 278 and on downwardly, compressing springs 276, a radial passage is opened between the valve chamber 194 and the space 280 above the main sleeve valve 196, between its inner and outer guides 198 and 200. This passage extends through radially cut-out portions as at 281 in the cylindrical, counterbored top end of the inner guide 198. The space 280 is otherwise isolated from the high pressure in the chamber 194 by a dynamic seal 282. The space 280 is also isolated from the ambient seawater region by another dynamic seal 283.

The space 280 continues into a slanted annular space 284 between the beveled edge 286 of the guide 198, shown behind the cut-out portion 281, and the beveled edge of a matching groove in the boundary member 244. The space 284 and thereby space 280 are connected by drilled passages as at 288 in boundary member 244 and retainer portion 238*a* to a gas pressure line 290 (FIG. 5) and thence through a restriction 292 and solenoid valve (SV) 294 to an ambient pressure (AP) vent 218′. Another set of drilled passages as at 296 in boundary member 244 and at 298 in the guide 198 in the guide 198 connect the space 268 under the pilot sleeve valve 266 to a gas pressure line 300, a connection 302 with line 290 and thence to solenoid valve 294 and ambient pressure vent 218′. As indicated by the dashed lines, passage 298 extends through the solid portion of guide 198 that is behind the cut-out portion 281. A third set of passages as at 304 in the boundary member 244 connect an annular groove 306 in its bottom face to a gas pressure line 308, and thence through a solenoid valve 310 to a high pressure gas source 216′. Line 308 has a branch 308*a* leading to the area of another port (not shown) and similarly the line 210 has another branch 210*a*.

In use, the device of FIG. 5 may be lowered into the ocean, wherein the valve chamber 194 may be pressurized with high pressure compressed air that is also fed to high pressure sources 216 and 216′ in a manner similar to that described in connection with FIG. 1. With all of the solenoid valves (SV) 212, 214, 294 and 310 de-energized, the valves are closed and ambient pressure (AP) prevails in the space between the O-rings 204 and 206 in the lower boundary member, as well as in the space 280 above the sleeve valve member 196 and in the space 268 below the pilot sleeve valve member. All parts are assumed to be in the position shown, with sleeve valve member 196 being in its base position closing the passage through port 192. The sleeve valve member is held closed since the high pressure in the valve chamber 194 acts on an axial thrust producing area 312 that is formed where the sleeve valve member 196 thickens inwardly at its lower rim.

When it is desired to generate an acoustic pulse in the seawater medium, solenoid valve 212 is energized momentarily, applying a first signal pulse of high pressure gas to lines 210 and 210*a* and thence to the differential thrust producing area of sleeve valve member 196 between O-rings 204 and 206. This pneumatic signal pulse causes sleeve valve member 196 to move upwardly, breaking the seal at O-ring 206. This allows the high pressure in chamber 194 to act on the full bottom facial area of sleeve valve member 196, driving the member 196 upwardly. The initial rise of the pressure pulse (FIG. 4) in the seawater medium begins as soon as the bottom edge of the fast-traveling member 196 clears the edge of the port formed by guide member portion 200a.

The passage through port 192 is fully opened once the sleeve valve member 196 reaches its displaced position. Then the sleeve valve member 196 is stopped almost instantly, without bouncing, when it strikes the upper boundary member 244. It is now ready to start its return to its base position, on signal.

In order for the sleeve valve member 196 to be stopped in this manner, the upper momentum exchange sleeve 246 is adapted for dynamic interaction with it, through the boundary member 244, so that the momentum exchange sleeve substantially acquires the momentum of the sleeve valve member 196 and thereby arrests its motion at the displaced position. The impact of the sleeve valve member 196 on the boundary member 244 causes a stress wave to be propagated through the boundary member, and most of the energy in this wave is transferred to the momentum exchange sleeve 246. This energy transfer is assisted by the provision of a clearance space 314 between the boundary member 244 and the end piece 248, a chamfer 316 around the inside bottom edge of the momentum exchange sleeve guide 250 and a groove 318 in the top face of the boundary member 244.

In the embodiment illustrated, the momentum exchange sleeve 246 has nearly the same mass and shape as the sleeve valve member 196. Hence the momentum exchange sleeve will originally have about the same velocity the sleeve valve member had when it was stopped. The momentum exchange sleeve 246 will be decelerated by the action of the annular dashpot formed with the snubbing chamber 254. After the sleeve 246 stops, it will be returned rather slowly by the springs 260 to the original position shown.

When a second signal is generated after an appropriate delay time $\tau$, it causes solenoid valve 310 to be opened momentarily, producing a second pneumatic signal that is applied as a pulse of high pressure air via line 308 and 308a to passage 304 and groove 306. This high pressure acts on top of pilot sleeve valve 266, pressing the pilot sleeve valve down slightly and compressing springs 276. As soon as the pilot valve 266 separates from O-ring 278, the pressure in valve chamber 194 can freely act on the pilot valve, pushing it all the way down and fully opening the passage from valve chamber 194 to the space 280 above the main sleeve valve member 196. The second signal may also appropriately cause solenoid valve 214 to be opened, venting the passage 208 to ambient pressure (AP) via line 210.

While both the top face and the bottom face of the sleeve valve member 196 are now in communication with the high pressure that still exists in valve chamber 194, the pressure on the bottom face is substantially reduced by the Bernoulli effect of the rush of air through the port 192 that is formed by the aerodynamically shaped portion of guide 198. The actions now being taken to close the passage through port 192 occur during the initial rise of the pressure pulse (FIG. 4) in the seawater medium. While the sleeve valve member 196 is in its fully displaced position, the widened rim 312 (FIG. 5) is retracted into a counterbore 314 to minimize air turbulence and pressure over the lower face of the sleeve valve member. Because of the difference in pressure acting on the axial thrust producing areas on the top and bottom faces of the sleeve valve member 196, the member is driven downwardly, closing the passage through port 192 and limiting the initial rise of the pressure pulse in the seawater medium. When the sleeve valve member 196 strikes the lower boundary member 202, the sleeve valve member stops almost instantly as its momentum is transferred to the momentum exchange sleeve 220. Sleeve 220 is decelerated by the dashpot mechanism, stopped, and then returned by spring 234.

In the meantime, the high pressure existing in space 280 above the sleeve valve member 196 is applied through the restriction 292 and line 300 to the space 268 under the pilot sleeve valve 266. When the pressure has equalized sufficiently, the springs 276 are able to close the pilot sleeve valve against O-ring 278.

In order to prepare the device for generating another acoustic pulse, in addition to recharging the valve chamber 194, the solenoid valve 294 is operated for a short time to return the pressure in the space 268 under the pilot sleeve valve, as well as the pressure in the space 280 above the sleeve valve member 196, to ambient pressure. Solenoid valve 214 is closed before the first signal is generated to produce another acoustic pulse in the medium.

Figure 6:
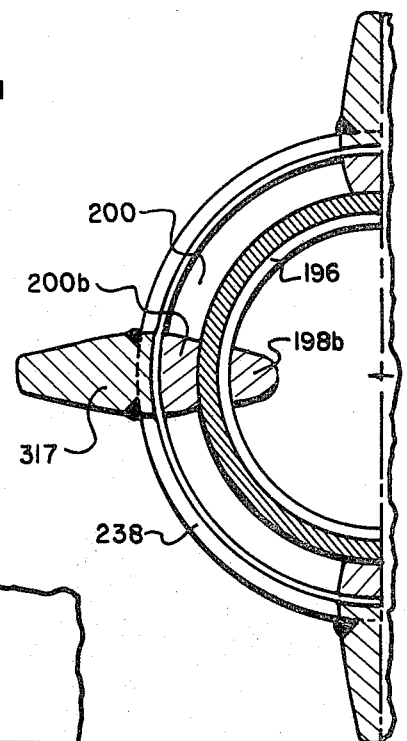
FIG. 6 is a section on the line 6—6 of FIG. 5.

FIG. 6 shows portions 198b and 200b of the inner and outer sleeve valve guides 198 and 200 that are needed for strength, but for purposes of clarity are omitted from FIG. 5. Shown also are outer reinforcing ribs as at 317.

Figure 7:
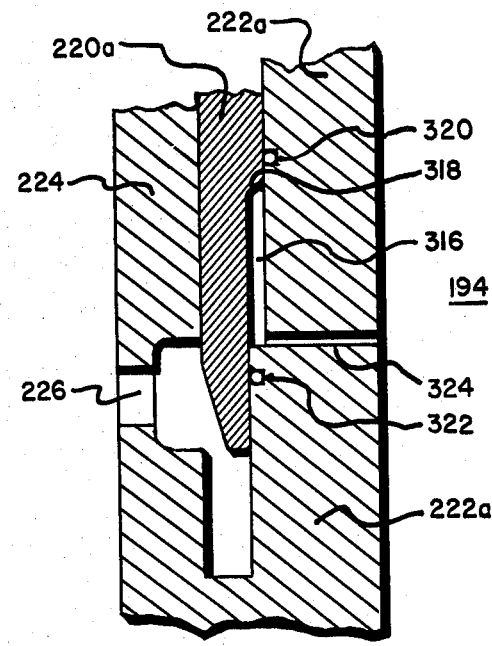
FIG. 7 shows a modification of a portion of the device of FIG. 5.

In a modification of the momentum exchange sleeve arrangement of FIG. 5, the function of the return springs 234 is performed by a pressure return as shown in FIG. 7. Here the upper outside portion of the lower end piece 222a has been turned to a smaller diameter so as to form an annular channel 316 inside the momentum exchange sleeve 220a. The lower end piece 222a contains dynamic seals 320 and 322. Drilled passages as at 324 in the lower end piece apply the high pressure in the valve chamber 194 to the channel 316. This pressure acts on the undersurface 318 of the sleeve 220a to produce an axial thrust urging the momentum exchange sleeve 220a upwardly.

Figure 8:
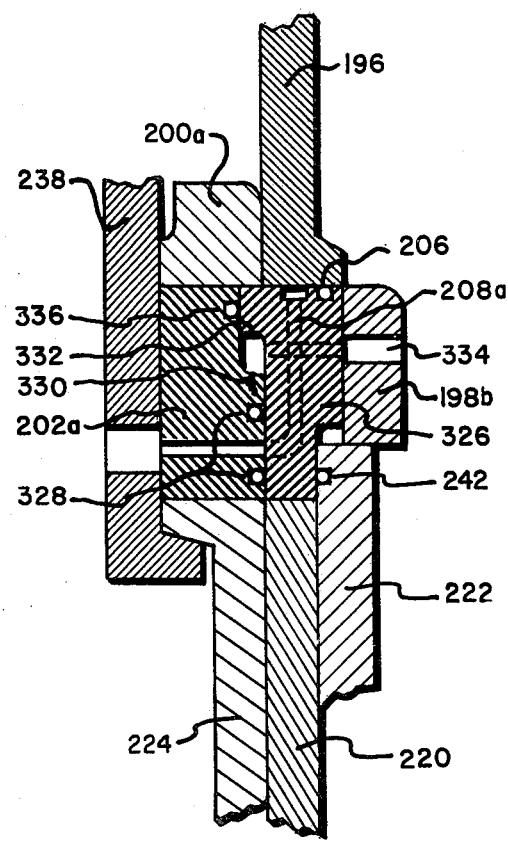
FIG. 8 shows a modification of another portion of the device of FIG. 5.

In the modification of FIG. 5 shown in FIG. 8, the boundary member 202a has an additional intermediate boundary member part 326 between the sleeve valve member 196 and the momentum exchange sleeve 220. Part 326 is free to move bodily under the impact of sleeve valve member 196 while imparting its momentum to the momentum exchange sleeve 220. The continuation of air passage 208a is sealed with O-rings 328. A channel 330 and a land 332 form a pressure return for the intermediate boundary member 326. The channel 330 receives pressure from the valve chamber 194 through passages as at 334 through the guide portion 198b and the intermediate boundary member 326, and the channel 330 is sealed with an O-ring 336.

While the invention has been shown and described in the form of particular procedures and apparatus, such showing and description is meant to be illustrative only and not restrictive, since obviously many changes and modifications can be made without departing from the spirit and scope of the invention. For example, as shown and described supra, the dashpots utilize seawater, whereas for certain uses in a land medium the seawater ports may need to be sealed. In this case, another suitable liquid such as shock absorber fluid may be used and contained within a suitable bladder or bladders or other reservoir means. As another example, the amplitude of the acoustic pulse can be augmented beyond the capacity of the air compressor by injecting or otherwise introducing a fuel into the valve chamber and igniting it at the proper time, in accordance with known techniques.

We claim:

1. The method of generating an acoustic pulse in a water or land medium utilizing a sleeve valve member that is axially movable between a base position closing the passage and a displaced position clearing the passage comprising the steps of confining compressed gas at high pressure in a valve chamber within the medium by holding the sleeve member in the base position, generating an initiating signal, responding to the signal by sleeve valve member towards the displaced position to open the passage for the compressed gas from the chamber into the medium so as to initiate the rise of a pressure pulse therein, generating externally of the valve chamber a second signal during the initial rise of the pressure pulse, responding to the second signal by closing the passage in a manner such that the initial rise of the pressure pulse is limited by the closure of the passage arresting the motion of the sleeve valve member at the displaced postion by substantially instantaneously transferring most of its momentum to a momentum exchange sleeve, and gradually decelerating the momentum exchange sleeve.

2. A method as in claim 1 utilizing first and second sleeve valve members, wherein the gas is confined in the valve chamber by holding the first sleeve valve member in the respective base position closing the passage, the second sleeve valve member being held in a respective base position clearing the passage, comprising responding to the initiating signal by moving the first sleeve valve member toward the respective displaced position wherein it clears the passage, and responding to the second signal by moving the second sleeve valve member from its respective base position toward a respective displaced position wherein the passage is closed.

3. A method as in claim 2 wherein the first sleeve valve member is allowed to reach its respective displaced position before the second sleeve valve member is moved from its respective base position, so that the passage is substantially fully open for a period of time determined by the length of the time interval between the initiating signal and the second signal.

4. A method as in claim 2 wherein the second sleeve valve member is moved from its respective base position before the first sleeve valve member reaches its respective displaced position, so that the passage is only partially open an amount determined by the length of the time interval between the initiating signal and the second signal.

5. A method as in claim 1, comprising responding to the second signal by driving the sleeve valve member toward the base position, arresting the motion of the sleeve valve member at the base position by substantially instantaneously transferring most of its momentum to a second momentum exchange sleeve, and gradually decelerating the second momentum exchange sleeve.

6. A compressed gas discharge device adapted for generating acoustic pulses, comprising a valve body encompassing a generally cylindrical valve chamber for containing compressed gas and having port means adapted to provided a passage from the valve chamber into a region surrounding the valve body, a first and a second sleeve valve member each enclosing a portion of the valve chamber and each being axially movable between a respective base position and a respective displaced position, the valve members being adapted to clear the passage when one member is in its base position and the other is in its displaced position, the valve members also being adapted to close and seal the passage when both members are engaged and occupy their displaced positions and when both engaged members are in transit from their displaced positions to their base positions, and signal responsive means for initiating movement of each sleeve valve member individually from its respective base position to its respective displaced position, thereby to control both the commencement and the time duration of a flow of gas from the valve chamber through the passage.

7. A device as in claim 6 wherein each of the valve members has axial thrust producing areas adapted to receive pressure from the compressed gas contained in the valve chamber, each of the valve members also having a differential axial thrust producing area, the device having means for individually sealing off the differential areas from the pressure of the gas contained in the valve chamber when the respective valve member is in its base position, the thrust producing areas being sized so that when the pressure in the valve chamber acts on the differential area of a respective valve member it receives a net axial force for driving it toward the displaced position, and wherein the signal response means selects the pressure acting on the differential areas at least while a respective valve member is in its base position.

8. A device as in claim 7 wherein the sealing off means is effective on arrival of the one member at its displaced position to seal off the differential area of the other member from the pressure of the gas contained in the chamber, and wherein the axial thrust producing areas of the one sleeve valve member are smaller than those of the other sleeve valve member, whereby a net axial force produces retraction of both sleeve valve members together from their displaced position to their base position.

9. A device as in any one of claims 6, 7 or 8 including annular dashpot means at least partially encircling a portion of the valve chamber, the dashpot means being effective when a sleeve valve member approaches its displaced position to decelerate the motion of the member.

10. A device as in claim 9 adapted for operation under water, wherein the dashpot means is in fluid-transfer communication with the underwater region surrounding the valve body when the device is in use.

11. A compressed gas discharge device adapted for generating acoustic pulses in a water or land medium, comprising a generally cylindrical valve chamber for containing compressed gas and having port means adapted to provide a passage from the valve chamber into a region surrounding the device gas pressure source means, a sleeve valve member enclosing a portion of the valve chamber and being axially movable between a base position closing the passage and a displaced position clearing the passage, the sleeve valve member having respective first and second axial thrust producing areas adapted to receive pressure from the gas pressure source means and to produce respective axial forces urging the valve member toward the respective base and displaced positions, signal responsive means for applying pressure from the gas pressure source means individually to the first and second axial thrust producing areas so as to selectively drive the sleeve valve member toward either its base or its displaced position, thereby to control the timing of both the commencement and the termination of a flow of gas from the valve chamber through the passage, momentum exchange sleeve means adapted for dynamic interaction with the sleeve valve member when it approaches one of its base and displaced positions so as to substantially acquire the momentum of the sleeve valve member and thereby arrest its motion at the one position, and annular dashpot means for decelerating the motion of the momentum exchange sleeve.

12. A device as in claim 11 adapted for operation under water, wherein the dashpot means is in fluid-transfer communication with the underwater region when the device is in use.

* * * * *